(12) United States Patent
Mcroberts et al.

(10) Patent No.: US 12,113,472 B2
(45) Date of Patent: Oct. 8, 2024

(54) METHOD AND SYSTEM FOR DETERMINING CRANKSHAFT POSITION IN AN ELECTRICAL GENERATING SYSTEM

(71) Applicant: PEGASUS AERONAUTICS CORPORATION, Waterloo (CA)

(72) Inventors: Matthew Mcroberts, Waterloo (CA); Joseph Kinsella, Waterloo (CA)

(73) Assignee: PEGASUS AERONAUTICS CORPORATION, Waterloo (CA)

( * ) Notice: Subject to any disclaimer, the term of this patent is extended or adjusted under 35 U.S.C. 154(b) by 0 days.

(21) Appl. No.: 17/616,167

(22) PCT Filed: Jun. 3, 2020

(86) PCT No.: PCT/IB2020/055230
§ 371 (c)(1),
(2) Date: Dec. 2, 2021

(87) PCT Pub. No.: WO2020/245737
PCT Pub. Date: Dec. 10, 2020

(65) Prior Publication Data
US 2022/0247332 A1    Aug. 4, 2022

Related U.S. Application Data

(60) Provisional application No. 62/856,344, filed on Jun. 3, 2019.

(51) Int. Cl.
*H02P 9/02* (2006.01)
*H02K 7/18* (2006.01)

(52) U.S. Cl.
CPC ............ *H02P 9/02* (2013.01); *H02K 7/1815* (2013.01)

(58) Field of Classification Search
CPC ................................ H02P 9/02; H02K 7/1815
See application file for complete search history.

(56) References Cited

U.S. PATENT DOCUMENTS

| 6,699,081 B1 * | 3/2004 | Divljakovic | .......... F02N 15/067 |
| | | | 440/85 |
| 7,105,938 B2 | 9/2006 | Edelson | |
| 2009/0153083 A1 * | 6/2009 | Rozman | .................. H02P 23/14 |
| | | | 318/400.11 |

(Continued)

FOREIGN PATENT DOCUMENTS

| WO | WO-2018026698 A1 | 2/2018 |
| WO | WO-2019215665 A1 | 11/2019 |

OTHER PUBLICATIONS

PCT/IB2020/055230, Method and System for Determining Crankshaft Position in a Electrical Generating System, Jun. 3, 2020.

*Primary Examiner* — Sean Gugger
(74) *Attorney, Agent, or Firm* — Perry + Currier

(57) ABSTRACT

A system and method are disclosed for determining the mechanical angular position of a rotating member of a prime mover which is connected, directly, or indirectly, to an electric machine, such as a permanent magnet synchronous machine or an induction machine. The electrical angular position of the rotor of the electric machine is determined by a sensorless AC motor control system, such as a Field Oriented Control System or back EMF control system, and is used in turn to determine the mechanical angular position of the rotating member.

19 Claims, 2 Drawing Sheets

(56) References Cited

U.S. PATENT DOCUMENTS

| | | | | |
|---|---|---|---|---|
| 2013/0154273 A1* | 6/2013 | Kurihara | .............. | H02K 7/1815 |
| | | | | 290/1 A |
| 2016/0173012 A1* | 6/2016 | Nondahl | ........... | H02M 7/53873 |
| | | | | 318/400.34 |
| 2019/0305703 A1* | 10/2019 | Holliday | ................ | F03D 17/00 |

* cited by examiner

METHOD AND SYSTEM FOR DETERMINING CRANKSHAFT POSITION IN AN ELECTRICAL GENERATING SYSTEM

FIELD OF THE INVENTION

The present invention relates to a method and system for determining the position of the crankshaft of a prime mover. More specifically, the present invention relates to a method and system for determining the position of the crankshaft of a prime mover which is connected to an electric machine.

BACKGROUND OF THE INVENTION

Electrical generating systems and the like are well known and include a variety of configurations. Recently, much interest and development effort has been devoted to hybrid drive systems which employ electrical generating systems. Such hybrid drive systems can employ two or more distinctive types of power, such as an electric motor and an internal combustion engine, to operate a final drive. Many configurations of hybrid drive systems are known, including systems wherein the prime mover generates electrical power for the final drive, which is an electric motor, or systems wherein the prime mover provides both mechanical and electrical energy to the final drive.

An advantage of such hybrid drive systems is that they can operate in a more fuel efficient and/or environmentally friendly manner than many conventional non-hybrid drive systems. However, in order to achieve much of the possible fuel efficiency and environmental benefits, the electrical generating system, and in particular the prime mover therein, must be operated in an efficient manner, i.e.—proper fuel mixtures, operating conditions, etc. must be maintained when operating the prime mover. In other applications, such as aeronautics, the improved efficiencies can also allow for reduced overall weight of the drive system (i.e.—an improved power to weight ratio) and/or increased reliability and can also provide needed electrical power for payloads, flight control systems, etc. in addition to the final drive.

In the last few decades, the operating efficiency of internal combustion engines has been significantly improved through the use of various sensors, systems and associated engine control units (ECUs). ECUs are computerized devices which can monitor the operating conditions of an internal combustion engine via a variety of sensors and then control the ignition timing, fuel mixture and/or fuel injectors, cooling systems and other auxiliary systems to achieve efficient operation of the internal combustion engines.

While such modern internal combustion engines are significant improvements over prior art systems, they do suffer from a disadvantage in that failure of a sensor can render the engine totally inoperable or, depending upon the particular sensor and ECU system, may cause the ECU to operate the engine in a fixed, "limp home" base operating capacity which is much less efficient than would otherwise be possible and/or which reduces the output of the engine.

For most, if not all, internal combustion engines, some of the most important sensors are the crankshaft position sensor and/or, for four-cycle motors with variable valve timing, a camshaft position sensor. These sensors provide the necessary mechanical engine timing information to the ECU which then uses that timing information to derive ignition timing and/or fuel injection timing, determine the rotational speed of the engine crankshaft, camshaft timing, etc.

In simpler internal combustion engines, the crankshaft position sensor is often a form of inductive pick up which senses the movement of gear teeth on the crankshaft as they move past the sensor as the crankshaft rotates. The sensor gear is manufactured with a gap, or "missing" tooth, in a known position relative to a position of the crankshaft and when the sensor output to the ECU indicates that the gap is passing the sensor, the ECU determines the position of the crankshaft and updates that position for each subsequently sensed tooth.

While relatively inexpensive, these inductive pick up sensors are subject to failures, but also offer limited accuracy with respect to the crankshaft position. This limited accuracy does affect the efficiency at which the engine can be operated, especially at higher operating speeds.

More recently, sensors using Hall Effect devices have been employed as crankshaft position sensors and/or camshaft position sensors. These sensors detect the presence of an indicator magnet, or piece of ferrous material blocking the indicator magnet, mounted in a known position on the crankshaft or camshaft and the output from the sensor allows the ECU to derive the position of the crankshaft and/or camshaft. Typically, the ignition controller (and/or ECU) estimates the rotational speed of the crankshaft from the timing associated with pulses received from the Hall Effect sensor and uses that estimated speed to calculate the needed timing for the ignition.

While the accuracy offered by such Hall Effect sensors is higher than that of inductive pickup sensors, the need to estimate rotational speeds still results in problems with accuracy and Hall Effect based sensors are also susceptible to failures, are generally fragile and tend to fail in an unpredictable manner.

Optical sensors have also recently been employed, in a similar manner to Hall Effect sensors, but such optical sensors suffer from similar problems and disadvantages as are suffered by Hall Effect sensors.

Thus, problems exist with known crankshaft position sensors, relating to their accuracy (i.e.—error in the sensed position of the crankshaft in terms of degrees of rotation), their expense and the durability of the sensor. For the most efficient operation of the internal combustion engine, it is desired to know the crankshaft position as accurately as possible—especially at high operating speeds—but such accuracy conventionally comes at a higher cost for the sensor and/or often a reduction in its durability, or may not be available at all.

It is desired to have a method and system of determining the position of the crankshaft, camshaft and/or other rotating member of an internal combustion engine which does not suffer from these, or other, disadvantages of the prior art.

SUMMARY OF THE INVENTION

It is an object of the present invention to provide a novel method and system for determining the position of a rotating member in the prime mover of an electrical generating system which obviates or mitigates at least one disadvantage of the prior art.

According to a first aspect of the present invention, there is provided an electrical generating system comprising: a power bus; an active rectifier connected to the power bus; a prime mover having a rotating member and being operable to generate mechanical energy from combustion of a fuel; an electric machine connected to the power bus via the active rectifier and having a rotor connected to the prime mover, the electric machine operable to convert mechanical energy from the prime mover into electrical energy supplied to the active rectifier and to receive electrical power from the active rectifier to produce mechanical energy; an engine control unit operable to control the prime mover; and a sensorless AC motor control system controlling the active rectifier and determining the angular position of the rotor and deriving the angular position of the rotating member therefrom and providing the determined position to the engine control unit to use to operate the prime mover.

Preferably, the sensorless AC motor control system is a field-oriented control system. Preferably, the electric machine is a permanent magnet synchronous machine. Preferably, the rotating member is a crankshaft.

According to another aspect of the present invention, there is provided a method of operating an electrical generating system including a power bus, an electric machine having a rotor, an active rectifier connected between the power bus and the electric machine, a prime mover having a rotating member, the rotor of the electric machine connected to the rotating member, an engine control unit to control the prime mover and a sensorless AC motor control system to control the active rectifier, comprising the steps of: (i) the sensorless AC motor control system rotating the rotor of the electric machine and the rotating member and determining the angular position of the rotating member wherein the sensorless AC motor control system detects the occurrence of a preselected condition, the sensorless AC motor control system using the determined angular position to convert an electrical angular position of the rotor determined by the sensorless AC motor control system to a calculated angular position of the rotating member; (ii) providing the calculated angular position of the rotating member to the engine control unit; and (iii) the engine control unit employing the calculated angular position of the rotating member to operate the prime mover.

Preferably, the sensorless AC motor control system is a field-oriented control system. Preferably, the electric machine is a permanent magnet synchronous machine. Preferably, the rotating member is a crankshaft.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
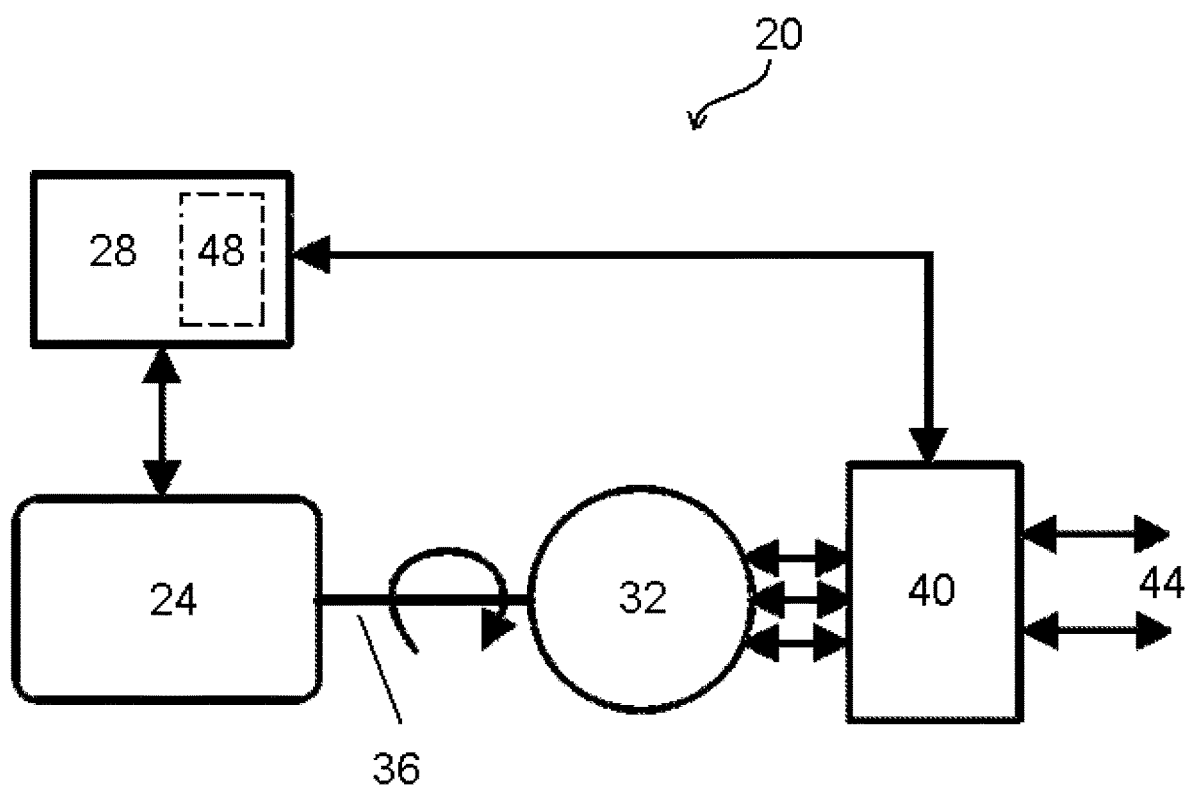
FIG. 1 shows a schematic representation of an example of an electrical generating system in accordance with an aspect of the present invention.

In FIG. 1 an electrical generating system, in accordance with an aspect of the present invention, is indicated generally at 20. System 20 includes a prime mover 24, which can be any of a variety of internal combustion engines, such as a two-cycle or four-cycle internal combustion engine, a Wankel rotary engine, etc. and prime mover 24 can be powered by any suitable fuel, such as gasoline, diesel oil, kerosene or a compressed or liquefied gas such as propane or natural gas, etc. Prime mover 24 is controlled and operated by an ECU 28 which can provide a variety of appropriate control signals, including ignition firing signals, fuel injection signals, throttle control signals, etc. to prime mover 24.

At least a portion of the mechanical output power of prime mover 24 is applied, via the rotation of a drive shaft 36, to an electric machine 32 which can be a permanent magnet synchronous electric machine, an induction motor or any other AC machine which can be operated by a sensorless AC motor control system, such as a Field Oriented Control (also known as a Vector Control) system or a Back EMF (or trapezoidal) Control system, as described below in more detail.

In many configurations, drive shaft 36 will be the crankshaft of prime mover 24, but it is contemplated that, in some configurations, drive shaft 36 can be a camshaft, distributor shaft, jackshaft or other rotating member of prime mover 24.

For example, it is contemplated that in addition to the case where electric machine 32 is the primary, or sole, mechanical load on prime mover 24 (i.e.—for an electric final drive), the present invention can also be employed in cases where electrical machine 32 is a secondary, or shared, load on prime mover 24, such as the case where electric machine 32 replaces or augments an alternator (not shown) for prime mover 24 and a mechanical load, such as a vehicle transmission, is the primary load on prime mover 24. In such cases or others, it is only required that the relationship between the angular position of the crankshaft of prime mover 24 and the angular position of drive shaft 36 be known.

In addition to drive shaft 36 being one of a variety of rotating members of prime mover 24, drive shaft 36 may instead be connected to prime mover 32 via a gear train (such as a transmission, etc.) or other linkage (neither of which is shown in FIG. 1). Again, such configurations can be employed as long as the relationship between the angular position of drive shaft 36 and electric machine 32 is known.

In such cases, as long as the relationship between the angular position of drive shaft 36 and the angular position of the crankshaft of prime mover 24 is known, simple mathematical operations (e.g. multiplying an angular position result obtained where drive shaft 36 is a camshaft by two to obtain the angular position of the crankshaft) which can be performed by ECU 28, or another part of system 20, to obtain the angular position of the crankshaft.

In the illustrated embodiment, electric machine 32 comprises at least one three-phase permanent magnet synchronous machine connected to an active rectifier 40 which, as described in more detail below, connects electric machine 32 to a DC power bus 44. Alternatively, in some configurations electric machine 32 can be an induction machine. While in the examples discussed below, electric machine 32 is a three-phase motor, it is also contemplated that electric machines with a greater number of phases can be employed, if desired.

Active rectifier 40 is controlled by ECU 28, as is also described below in more detail. DC power bus 44 can connect to an energy consuming element, such as a final drive and/or to an energy storage system such as a battery or super capacitor (neither of which are shown in FIG. 1).

As is known to those of skill in the art, control and rectification of a permanent magnet synchronous electric machine, such as electric machine 32, requires the appropriately timed switching of each of the phases of the electric machine to the appropriate side of a DC power source, such as DC power bus 44, both when operating electric machine 32 as a motor or as a generator. This switching can be performed by active rectifier 40, for example, via a MOSFET switching bridge which is provided with appropriate pulse width modulated (PWM) gating signals.

In the illustrated embodiment of FIG. 1, these PWM gating signals are provided via a sensorless AC motor control system 48, such as a Field Oriented Control (FOC) system (also referred to as Vector Control) or a Back EMF (also referred to as a Trapezoidal) Control system. Such sensorless AC control systems do not employ a rotor positional sensor and instead can derive the angular rotational position of the rotor from the voltages and currents in the phases of the motor.

In the illustrated embodiment, and in the following discussion, the sensorless AC motor control system 48 is a Field Oriented Control system, implemented by ECU 28. However, it should be apparent to those of skill in the art that sensorless AC motor control system 48 can be any suitable system or method of controlling an AC electric machine wherein the position of the rotor is derived from the electrical operation of the AC machine, eliminating the need for a rotor angular position sensor.

Controlling inductive electric machines or permanent magnet synchronous machines, such as electric machine 32, via sensorless AC motor control systems such as FOC or Back EMF control systems is well known and has proven to be a substantially efficient manner of operating such machines.

When sensorless AC motor control system 48 employs FOC to determine the appropriate timing for the PWM gating signals it produces, sensorless AC motor control system 48 measures the current (and polarity) in at least two phases of the electric machine to determine the electrical position of the machine's rotor poles, relative to the stator poles.

Sensorless AC motor control system 48 controls electric machine 32 without requiring any positional sensors being required, as the angular position of the rotor relative to the stator is derived solely, and accurately, from the currents in the stator coils.

While in the examples described herein sensorless AC motor control system 48 is implemented by ECU 28, it should be understood that the present invention is not so limited and sensorless AC motor control system 48 can also be implemented in a variety of manners, including as a standalone controller, or as part of another control system in system 20.

The present inventors have determined that sensorless AC motor control system 48 can use the determined electrical angular position of the rotor of electric machine 32 to also determine the rotational angular position of drive shaft 36, and hence to be able to determine the angular position of the crankshaft of prime mover 24, thus removing the need for a separate crankshaft position sensor. By removing the need for a separate crankshaft position sensor, a possible failure source of system 20 is removed and the cost and system weight is reduced (important for many applications such as aeronautics).

Further, using sensorless AC motor control system 48 to determine the angular position of the crankshaft can provide more accurate positioning results than can be achieved with many conventional crankshaft position sensors. In a current embodiment of the present invention, sensorless AC motor control system 48 has sufficient computational capability to determine the angular position of the rotor of electric machine 32 fifteen thousand times a second.

If, for example, drive shaft 36 is rotating at eight thousand RPM, this results in a rotor angular position accuracy of about three degrees. Operation of prime mover 24 at a lower RPM rate, or increasing the computational capability of sensorless AC motor control system 48, can provide increased positional accuracy, if desired. For example, at four thousand RPM, a rotor positional accuracy of about one point six degrees will be obtained with the same implementation of sensorless AC motor control system 48.

Further, as the relationship between the angular position of drive shaft 36 of prime mover 24 and the rotor angular position of electric machine 32 is known, and does not vary, interpolation between measured positions is easily performed with very accurate results.

Figure 2:
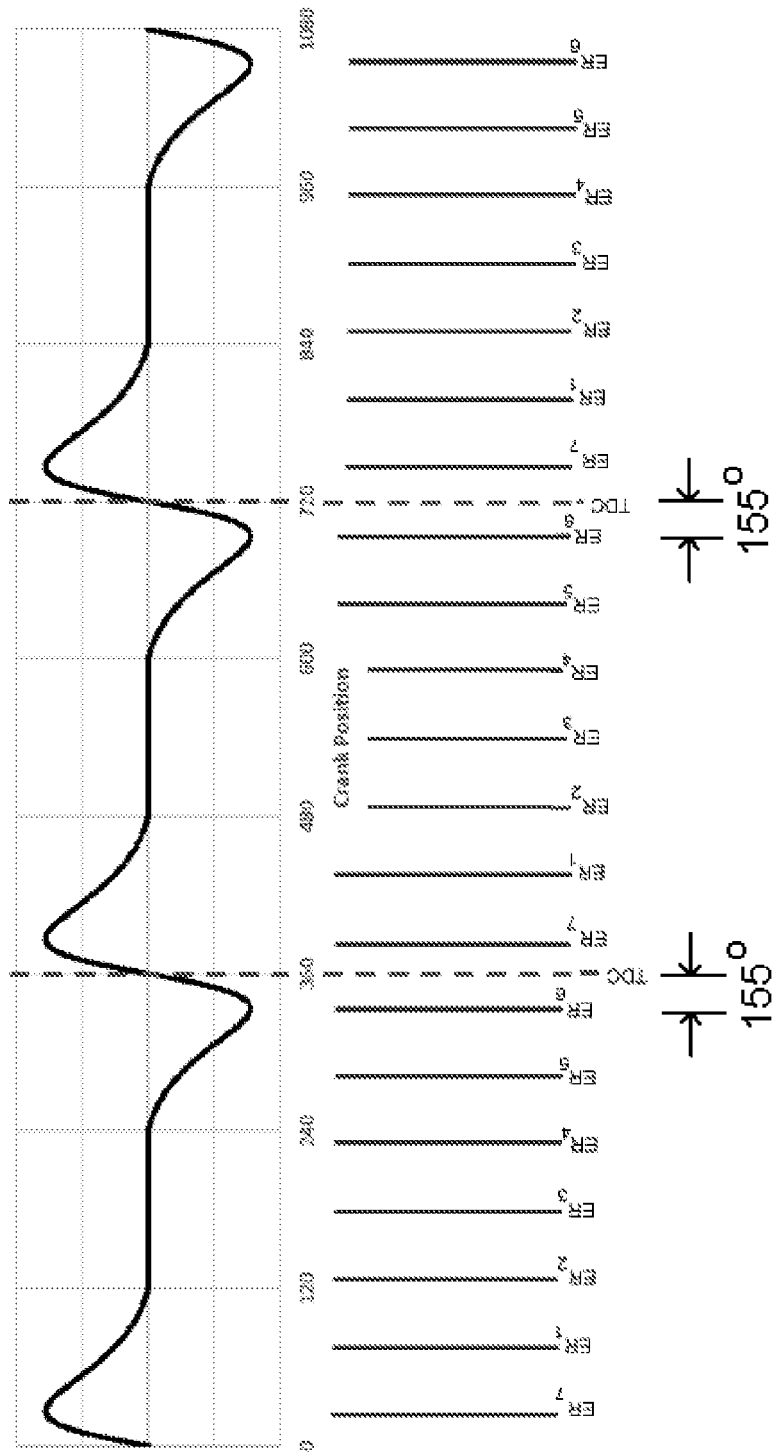
FIG. 2 shows a graphical representation of the relationship between electrical revolutions and mechanical revolutions of system 20.

In order to use sensorless AC motor control system 48 to determine the position of the crankshaft of prime mover 24, in accordance with an aspect of the present invention, it is necessary to perform calculations in addition to those normally performed by a sensorless AC motor control system. Specifically, as electric machine 32 typically includes multiple pairs of poles, sensorless AC motor control system 48 will measure several complete electrical rotations of the rotor with respect to the stator pairs for each actual mechanical rotation of the rotor. In a current embodiment of the present invention, electric machine 32 is a permanent magnet synchronous machine which includes seven pairs of permanent rotor magnets (i.e.—fourteen magnets) and thus sensorless AC motor control system 48 measures seven complete electrical revolutions ("ER") of the rotor for each actual one mechanical revolution ("MR") of the rotor. An example of this is shown in FIG. 2.

So, while sensorless AC motor control system 48 can determine the electrical angular position of the rotor of electric machine 32 with a high level of accuracy, the relationship between the determined electrical angular position and the mechanical angular position of drive shaft 36 must further be determined and, in particular, the relationship between the determined electrical angular position and a selected mechanical angular position of drive shaft 36, and hence the crankshaft of prime mover 24, such as a top dead center (TDC) reference point, must be determined.

In the simple case wherein electric machine 32 has a single pair of rotor poles, so that one electrical revolution of the rotor corresponds to one mechanical revolution, then the angular position relationship between the rotor and drive shaft 36 can be determined at time of manufacture and/or assembly of system 20. In such a case, during assembly/manufacture of prime mover 24 and electric machine 32, the angular relationship between the rotor of electric machine 32 and drive shaft 36 of prime mover 24 is carefully determined (and fixed) and appropriate data defining this determination is provided to sensorless AC motor control system 48 so that when the angular position of the rotor is determined, it will also be able to determine the angular position of drive shaft 36.

In the more practical case wherein the rotor of electric machine 32 has several pairs of polls, sensorless AC motor control system 48 detects an electrical revolution (ER) for each pair of poles within each mechanical revolution (MR) of the rotor and drive shaft 36. In other words, if electric machine 32 has three pairs of poles in its rotor, then sensorless AC motor control system 48 will measure three electrical revolutions (e.g.—$ER_1$, $ER_2$, $ER_3$) for each one mechanical revolution "MR" of drive shaft 36. It is therefore necessary to relate the angular position of the rotor, determined by sensorless AC motor control system 48, within an electrical revolution ($ER_x$), to the angular position of the rotor, and thus drive shaft 36, within a mechanical revolution (MR). Sensorless AC motor control system 48 must determine both which electrical revolution ($ER_x$) of the rotor and the angular position of the rotor within that electrical revolution ($ER_x$) that corresponds to the selected position in the mechanical revolution (MR) that is the selected mechanical reference position. Once the relationship between the electrical angular position within an electrical rotation and the angular position of the rotor at the selected angular position in a mechanical rotation is established, system 20 can determine the angular position of drive shaft 36 as needed.

One method of determining this required relationship can be to also provide a mechanical index position sensor, such as a Hall Effect sensor or optical sensor, to establish the relationship between the electrical angular position determined by sensorless AC motor control system 48 and the mechanical angular position of drive shaft 36 (determined with limited accuracy by the index position sensor) during startup of system 20. At startup, the index position sensor will provide sensorless AC motor control system 48 with an indication of the angular position of drive shaft 36 within the mechanical revolution (MR) of prime mover 24. Sensorless AC motor control system 48 can then determine on which electrical revolution ($ER_x$) the desired reference point (i.e.—TDC) will occur. When sensorless AC motor control system 48 knows which electrical revolution the reference point will occur on, it can then provide accurate angular positions of drive shaft 36 as desired.

For example, the index position sensor data can indicate to sensorless AC motor control system 48 that drive shaft 36 is approximately forty degrees of mechanical revolution from a desired reference point (i.e.—TDC). In the example discussed above and shown in FIG. 2, there are seven ERs (each of three hundred and sixty degrees) per each MR (also of three hundred and sixty degrees). So, one degree of MR is equal to approximately seven degrees of ER. If drive shaft 36 is at approximately forty degrees of MR (as measured from TDC), then it is approximately three hundred and twenty degrees to the next occurrence of TDC and that is equivalent to approximately two-thousand, two-hundred and forty degrees of electrical revolution.

If we refer to the initial ER, when the mechanical angular position is measured by the index position sensor (typically during startup of system 20), as $ER_1$ then sensorless AC motor control system 48 can determine that TDC will occur during $ER_6$.

As explained above, sensorless AC motor control system 48 can accurately determine the angular position of the rotor within an electrical revolution so once the initial gross relationship between MRs and ERs is established, sensorless AC motor control system 48 can accurately determine the occurrence/position of the desired reference point (e.g.—TDC).

In the example above, it has been assumed that drive shaft 36 is the crankshaft of prime mover 24. As previously discussed, if drive shaft 36 is another rotating member of prime mover 24, such as a camshaft, a simple additional mathematical step may need to be performed to relate the position drive shaft 36 to the position of the crankshaft of prime mover 24. For example, if drive shaft 36 is a camshaft and prime mover 24 is a four-cycle engine, the result of the above-described calculation will need to be adjusted by a factor of two, as the camshaft rotates once for every two revolutions of the crankshaft.

If the crankshaft of prime mover 24 is connected to drive shaft 36 via a transmission, gear train or other linkage, the ratio of that connection would be mathematically applied in a similar fashion to obtain the position of the crankshaft.

While the need for the additional sensor in the above-described embodiment can introduce the possibility of failures of the system due to a failure of the sensor, it is believed that the improved accuracy of the crankshaft angular position, obtained from the present invention, still provides a worthwhile benefit over a system which merely employs a Hall Effect or other sensor as the sole means to determine crankshaft position on an ongoing basis.

In a second, and presently preferred, implementation of the invention, no index position sensor is required and the necessary relationship between ER and MR is determined, at least at startup, as described below. As before, in this example electric machine 32 includes seven pairs of rotor poles and thus sensorless AC motor control system 48 measures seven ERs for each MR.

In a first configuration, the amount of torque produced by the electrical machine 32 (which can easily be determined by sensorless AC motor control system 48) is determined, in addition to the angular position of the rotor (ER). Accordingly, at startup of system 20 electric machine 32 is operated as a starter motor, drawing power from DC power bus 44, to rotate drive shaft 36.

As will be apparent to those of skill in the art, the torque required from electric machine 32 to rotate drive shaft 36, and thus prime mover 24 (when prime mover 24 is not running) will change from a positive value (as torque is applied to prime mover 24), required to compress the contents of the cylinder of prime mover 24 on the compression stroke, to a negative value of torque as the contents of the cylinder of prime mover 24 re-expand on the power stroke. This "zero-crossing" where the torque value changes from positive to negative substantially corresponds to the mechanical position TDC of prime mover 24.

The technique for identifying a selected mechanical position of the crankshaft (or other rotating member) of prime mover 24 is not limited to locating TDC and other changes to the input torque level can be employed instead, if desired. For example, in a two-cycle motor it is possible to identify the change to the input torque which occurs when the exhaust port is uncovered by the piston and to use that detected mechanical rotational position as a reference to relate the electrical rotation angular position.

Once determined, the TDC (or other appropriate) position value can be stored for subsequent operations of system 20 until system 20 is next restarted. It is further, contemplated that, if desired, this position value can be updated and refined, from time to time, during operation of system 20.

If prime mover 24 is a single-cylinder two-cycle engine, the relationship between ERs and MRs can be determined as follows. At startup electric machine 32 will turn prime mover 24 through at least one full revolution, at a substantially constant speed and without providing an ignition spark or a fuel injection operation, and sensorless AC motor control system 48 measures the torque produced by electric machine 32 to detect the above-described "zero-crossing". The ER and position within that ER where the zero-crossing occurs is then deemed by sensorless AC motor control system 48 as TDC (or another selected reference point. This established relationship between ERs and the MR is then used to derive the angular position of the crankshaft (or other relevant angular position) of prime mover 24 on an ongoing basis, allowing prime mover 24 to be started and operated, as described below.

In the illustrated example of FIG. 2, TDC is determined to occur at one-hundred and fifty-five electrical degrees of rotation on $ER_6$.

In another embodiment, sensorless AC motor control system 48 can determine the relationship between ERs and MRs as follows. AC motor control system 48 operates electric machine 32 to produce constant torque to rotate prime mover 24, rather than constant speed, and measures the instantaneous speed of prime mover 24 (which sensorless AC motor control system 48 does as a normal part of its operation).

As will now be apparent, the instantaneous speed of the crankshaft of prime mover 24 will "zero-cross" from a decreasing value (as the contents of the cylinder are compressed) to an increasing value (as the contents of the cylinder expand) at TDC, thus allowing sensorless AC motor control system 48 to determine TDC of prime mover 24 in a manner similar to the torque-based approach described above.

Once sensorless AC motor control system 48 has determined the relationship between ER and MR and position of a reference position, such as TDC, by either of the two methods described above, it can provide crankshaft position information to ECU 28 to allow ECU 28 to provide appropriate ignition, fuel injection and/or other signals to prime mover 24 to start prime mover 24. As prime mover 24 starts, ECU 28 can also start controlling electric machine 32 as a generator to supply power to DC power bus 44.

Similar techniques for relating mechanical revolutions (MR) to electrical revolutions (ER) can be employed on different configurations (more cylinders, four-cycle engines, etc.) of prime mover 24 For example, when using the torque determining method described above for a single-cylinder four-cycle engine, at startup electric machine 32 will turn prime mover 24 through at least two complete mechanical revolutions, again without ignition or fuel, at a constant speed while monitoring the torque required from electric machine 32 to rotate prime mover 24. Unlike a two-cycle engine which only has a combustion stroke and an exhaust stroke, a four-cycle engine includes intake, compression, combustion/power and exhaust strokes. However, the maximum torque required to rotate a four-cycle prime mover occurs during the compression stroke and thus sensorless AC motor control system 48 monitors the torque produced by electric machine 32 to determine the zero-crossing which occurs after maximum positive torque has been produced and deems this zero-crossing to be TDC which is then used as the reference to start and operate prime mover 24, as described before.

In the case of multi-cylinder two or four-cycle engines, additional steps are required, but should now be apparent to those of skill in the art. Specifically, sensorless AC motor control system 48 will operate to determine the crankshaft position at which a torque or speed (depending upon whether the constant speed, or constant torque approach is employed) zero-crossing occurs, as before, and thus sensorless AC motor control system 48 determines a first detected TDC position for the crankshaft.

However, as will be apparent, this first detected TDC position is merely one of several TDC positions (one for each cylinder of prime mover 24) and sensorless AC motor control system 48 will not yet be able to determine which cylinder the detected TDC corresponds to. For example, in a two-cylinder prime mover, the detected TDC determined by sensorless AC motor control system 48 could be for either cylinder.

Accordingly, in this case once sensorless AC motor control system 48 has determined a first detected TDC, this TDC information is provided by sensorless AC motor control system 48 to ECU 28 which will assume that the TDC information relates to a first cylinder and ECU 28 will attempt to start prime mover 24 using that timing information provided by sensorless AC motor control system 48.

ECU 28 will attempt to start prime mover 24 for a pre-selected number of mechanical revolutions and, if successful, ECU 28 will know that the TDC information provided does in fact correspond to the selected cylinder.

Alternatively, if prime mover 24 does not start within the preselected number of mechanical revolutions, ECU 28 assumes that the TDC information relates to another cylinder and shifts the TDC information by the relevant number of degrees. For example in a two-cylinder two-cycle prime mover, TDC for one cylinder can be one-hundred and eighty degrees shifted from TDC for the other cylinder. Thus, in such a case ECU 28 will mathematically adjust the TDC information provided from sensorless AC motor control system 48 by adding one-hundred and eighty degrees to the position. ECU 28 will then again attempt, for a preselected number of mechanical revolutions, to start prime mover 24 as described above. If prime mover 24 does not start, this process will repeat for each cylinder until the TDC information is related to the correct cylinder.

The amounts by which ECU 28 will shift TDC information for other configurations of prime movers will be apparent to those of skill in the art. For example, a two-cylinder four-cycle prime mover 24 can require a three-hundred and sixty degree shift.

It is also contemplated that a simple indexing sensor (such as an optical sensor or Hall Effect sensor) can be employed with multi-cylinder systems to allow sensorless AC motor control system 48 to relate a determined TDC position to a particular cylinder. In such a case, the indexing sensor need not have a high degree of accuracy and thus can be inexpensive. The benefit of employing such an indexing sensor is that, for prime movers having more than two cylinders, startup of prime mover 24 can occur faster as ECU 28 does not spend time (and crankshaft rotations) "testing" its assumption about which cylinder the determined TDC relates to.

It is further contemplated that, if such an indexing sensor is employed to simplify startup of prime mover 24, the above-described "assume and test" starting technique can be employed as a backup technique, should the indexing sensor fail.

As is also mentioned above, in some cases the mechanical angular position of the rotor of electric machine 32 is related, in a fixed but non-one-to-one relationship, to the mechanical position of the crankshaft of prime mover 24 through a transmission, gear train, etc. In such a case, ECU 28 will adjust the timing information from sensorless AC motor control system 48 accordingly via an appropriate mathematical operation.

As will now be apparent to those of skill in the art, the present invention comprises a system and method for determining the mechanical angular position of the crankshaft of a prime mover whose crankshaft is connected directly, or indirectly, to an electric machine. The electrical angular position of the electric machine is determined by a sensorless AC motor control system, such as a Field Oriented Control System, and is used in turn to determine the mechanical angular position of the crankshaft using a relationship between the electrical angular position and the mechanical angular position. In many cases that relationship will be determined as part of a startup process for the prime mover.

The above-described embodiments of the invention are intended to be examples of the present invention and alterations and modifications may be effected thereto, by those of skill in the art, without departing from the scope of the invention which is defined solely by the claims appended hereto.

We claim:

1. An electrical generating system comprising:
a power bus;
an active rectifier connected to the power bus;
a prime mover having a rotating member and being operable to generate mechanical energy from combustion of a fuel;
an electric machine connected to the power bus via the active rectifier and having a rotor connected to the prime mover, the electric machine operable to convert mechanical energy from the prime mover into electrical energy supplied to the active rectifier and to receive electrical power from the active rectifier to produce mechanical energy;
an engine control unit operable to control the prime mover; and
a sensorless AC motor control system controlling the active rectifier and determining the angular position of the rotor and deriving the angular position of the rotating member therefrom and providing the determined position to the engine control unit to use to operate the prime mover;
wherein, for each rotation of the rotating member the rotor of the electric machine completes at least two electrical rotations and wherein the engine control unit relates each rotation of the rotating member to one of the at least two electrical rotations; and
wherein the electric machine rotates the prime mover through at least one complete operating cycle and the sensorless AC motor control system operates to detect a predefined angular position of the rotating member, the engine control unit responsive to the detected predefined rotational position to relate the detected predefined angular position to one of the at least two electrical rotations.

2. The system of claim 1 wherein the sensorless AC motor control system is a field oriented control system.

3. The system of claim 1 wherein the electric machine is a permanent magnet synchronous machine.

4. The system of claim 1 wherein the rotating member is a crankshaft.

5. The system of claim 1 wherein the rotating member is a camshaft.

6. The system of claim 1 wherein the electric machine rotates the prime mover at a constant speed and the sensorless AC motor control system measures the torque required to perform the rotation and the sensorless AC motor controller identifies the occurrence of a predefined change in the measured torque value to determine a preselected angular position of the rotating member.

7. The system of claim 1 wherein the electric machine rotates the prime mover at a constant torque and the sensorless AC motor control system measures the speed of the rotating member and the sensorless AC motor controller identifies the occurrence of a predefined change in the measured speed to determine a preselected angular position of the rotating member.

8. The system of claim 1 further comprising an index position sensor operable to indicate the angular position of the rotating member relative to a predefined condition and wherein the sensorless AC motor control system relates the angular position of the rotating member to an electrical angular position of the rotor of the electric machine from the index position sensor.

9. A method of operating an electrical generating system including a power bus, an electric machine having a rotor, an active rectifier connected between the power bus and the electric machine, a prime mover having a rotating member, the rotor of the electric machine connected to the rotating member, an engine control unit to control the prime mover and a sensorless AC motor control system to control the active rectifier, comprising the steps of:

(i) the sensorless AC motor control system rotating the rotor of the electric machine and the rotating member and determining the angular position of the rotating member wherein the sensorless AC motor control system detects the occurrence of a preselected condition, the sensorless AC motor control system using the determined angular position to convert an electrical angular position of the rotor determined by the sensorless AC motor control system to a calculated angular position of the rotating member;

(ii) providing the calculated angular position of the rotating member to the engine control unit; and (iii) the engine control unit employing the calculated angular position of the rotating member to operate the prime mover.

10. The method of claim 9 wherein the sensorless AC motor control system is a field oriented control system.

11. The method of claim 9 wherein the rotating member is a crankshaft of the prime mover.

12. The method of claim 9 wherein the sensorless AC motor control system determines the angular position of the rotating member at which the preselected condition occurs by:

(a) causing the electric machine to rotate the prime mover through at least one complete cycle;

(b) determining the angular position of the rotating member where the preselected condition occurs;

(c) relating the determined angular position of the rotating member at which the preselected condition occurs to convert the electrical angular position determined by the sensorless AC motor control system to relate the electrical angular position of the rotor of the electric machine to the determined angular position of the rotating member;

(d) providing the related electrical angular rotating position to the engine control unit to operate the prime mover.

13. The method of claim 9 wherein the electric machine operates to rotate the prime mover at a constant speed and the sensorless AC motor controller determines the torque applied to the rotating member by the electric machine, the occurrence of the preselected condition being detected by a corresponding change in the determined torque.

14. The method of claim 9 wherein the electric machine operates to rotate the prime mover at a constant torque and the sensorless AC motor controller determines the rotational speed of the rotating member, the occurrence of the preselected condition being detected by a corresponding change in the determined rotational speed.

15. The method of claim 9 wherein the electrical generating system further includes an index sensor operable to determine the angular position of the rotating member and wherein the sensorless AC motor controller uses the determined angular position of the rotating member to determine the relative electrical angular position of the rotor.

16. An electrical generating system comprising:
a power bus;
an active rectifier connected to the power bus;
a prime mover having a rotating member and being operable to generate mechanical energy from combustion of a fuel;

an electric machine connected to the power bus via the active rectifier and having a rotor connected to the prime mover, the electric machine operable to convert mechanical energy from the prime mover into electrical energy supplied to the active rectifier and to receive electrical power from the active rectifier to produce mechanical energy;

an engine control unit operable to control the prime mover;

a sensorless AC motor control system controlling the active rectifier and determining the angular position of the rotor and deriving the angular position of the rotating member therefrom and providing the determined position to the engine control unit to use to operate the prime mover; and an index position sensor operable to indicate the angular position of the rotating member relative to a predefined condition and wherein the sensorless AC motor control system relates the angular position of the rotating member to an electrical angular position of the rotor of the electric machine from the index position sensor;

wherein, for each rotation of the rotating member the rotor of the electric machine completes at least two electrical rotations and wherein the engine control unit relates each rotation of the rotating member to one of the at least two electrical rotations.

17. The system of claim 16 wherein the sensorless AC motor control system is a field oriented control system.

18. The system of claim 16 wherein the electric machine is a permanent magnet synchronous machine.

19. The system of claim 16 wherein the rotating member is a crankshaft or camshaft.

\* \* \* \* \*